UNITED STATES PATENT OFFICE.

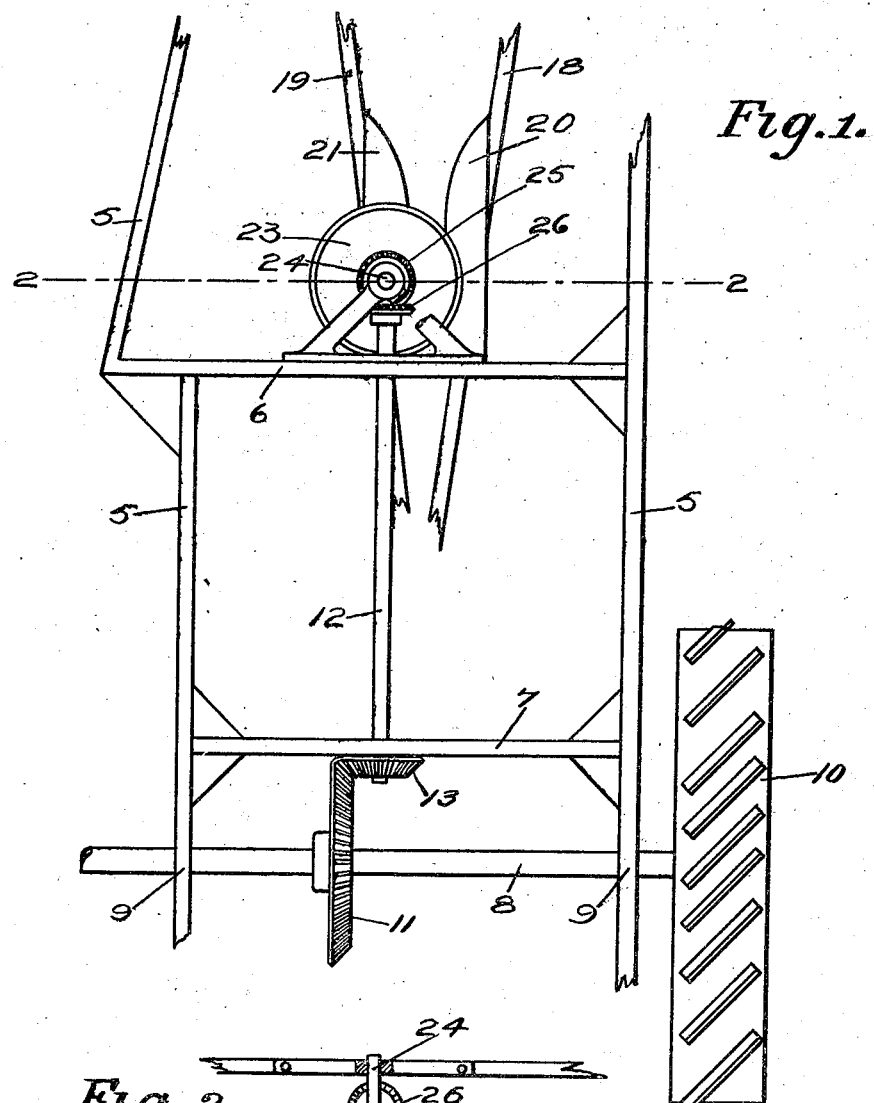

ROBERT RAY ZAHNTER, OF KANSAS CITY, MISSOURI.

SICKLE.

1,342,369.   Specification of Letters Patent.   Patented June 1, 1920.

Application filed August 20, 1919. Serial No. 318,811.

*To all whom it may concern:*

Be it known that I, ROBERT RAY ZAHNTER, a citizen of the United States, residing at Kansas City, in the county of Jackson and State of Missouri, have invented a new and useful Sickle, of which the following is a specification.

This invention relates to corn binders, and more particularly to the cutting apparatus thereof.

In the corn binders now in use, the usual cutting apparatus includes reciprocating knives, operatively connected with the bull wheel of the machine, for reciprocating the knives, whereby the cutting operation is performed.

It is therefore the primary object of the present invention to improve the cutting mechanism in use, to obviate the vibrations of the machine due to the irregular, and jerky operation of the cutting apparatus.

A further object of the invention is to provide a rotary knife, in combination with stationary knives, the rotary knife having connection with the frame of the machine, and power shaft thereof in such a manner as to be rapidly rotated to efficiently cut the stalks of the crop being harvested.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 illustrates a fragmental view of a binder showing the invention applied thereto.

Fig. 2 illustrates a sectional view taken on line 2—2 of Fig. 1.

Having reference to the drawings in detail, the reference character 5 designates the side bars of the machine, to which are secured the transverse bars 6 and 7, located at the front and rear of the machine.

As shown, the frame is supported by the shaft 8 extending through bearings 9, formed in the side bars 5 of the machine, said shaft 8 being supported by the bull wheels 10, keyed to said shaft to impart rotary movement thereto, which in turn transmits rotary movement to the beveled pinion 11, keyed thereto substantially intermediate its length.

In the showing of the invention, I have only disclosed one of the wheels which support the device. Since both wheels are identical, it is believed that the present showing will clearly set forth the invention.

A substantially long shaft 12, has one of its ends supported in the rear bar 7, of the frame and carries a beveled pinion 13, on one end thereof, which pinion meshes with the beveled pinion 11, for transmitting rotary movement to said shaft 12, which in turn imparts rotary movement to the beveled gear 26.

Supported adjacent the forward end of the machine, are the substantially long guide arms 18 and 19, having converging inner walls, converging toward the center of the transverse bar 6, but held in spaced relation at their point of connection with the transverse bar 6, to provide a clearance to permit the stalks of the crop being harvested, to enter between the stationary knives 20 and 21, which are supported on the arms 18 and 19.

Rotating in a horizontal plane at a point eccentric to the central line of the space between the knives 20 and 21, is the disk-like cutting element 23, supported centrally of the vertical shaft 24, which is provided with the beveled gear 25, meshing with the beveled gear 26, secured to one end of the shaft 12, to rotate therewith.

From the foregoing it will be seen that, due to the arrangement of shaft and beveled pinions, rotary movement of the power shaft 8, is transmitted to the rotary cutting disk 23, and due to its location, with relation to the stationary cutting knives 20 and 21, it is obvious that a shearing action of the disk 23, on the stalks being cut, is insured.

While I have described a particular construction of frame of the machine, it is to be understood that the frame of the machine forms no part of the invention, and may be of any appropriate construction.

Having thus described my invention, what is claimed is:—

In a harvesting machine, a frame, relatively long guide fingers extending from the forward portion of the frame and converging toward the frame, in combination with stationary cutting blades supported adjacent the inner extremities of the guiding fingers, a rotary knife supported directly above the stationary cutting blades in close proximity thereto, said rotary knife operating in a circle whose center is located to one side of the cutting edges of the stationary cutting blades, and means for operating the rotary knife.

In testimony that I claim the foregoing as my own, I have hereto affixed my signature in the presence of two witnesses.

ROBERT RAY ZAHNTER.

Witnesses:
L. V. WILLIAMS,
G. CADWALADER.